(12) United States Patent
Salmela et al.

(10) Patent No.: US 8,407,769 B2
(45) Date of Patent: Mar. 26, 2013

(54) METHODS AND APPARATUS FOR WIRELESS DEVICE REGISTRATION

(75) Inventors: Patrik Mikael Salmela, Kirkkonummi (FI); Kristian Slavov, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1055 days.

(21) Appl. No.: 12/135,256

(22) Filed: Jun. 9, 2008

(65) Prior Publication Data

US 2009/0217348 A1  Aug. 27, 2009

Related U.S. Application Data

(60) Provisional application No. 61/030,695, filed on Feb. 22, 2008.

(51) Int. Cl.
*G06F 7/00* (2006.01)
(52) U.S. Cl. .......................................................... 726/6
(58) Field of Classification Search .................. None
See application file for complete search history.

(56) References Cited

U.S. PATENT DOCUMENTS

| | | | | |
|---|---|---|---|---|
| 6,064,879 A * | 5/2000 | Fujiwara et al. | ............. | 455/419 |
| 6,195,705 B1 * | 2/2001 | Leung | ............. | 709/245 |
| 6,445,914 B1 * | 9/2002 | Findikli et al. | ............. | 455/411 |
| 6,463,055 B1 * | 10/2002 | Lupien et al. | ............. | 370/353 |
| 6,707,809 B1 * | 3/2004 | Warrier et al. | ............. | 370/351 |
| 6,822,971 B1 * | 11/2004 | Mikkonen | ............. | 370/475 |
| 6,980,830 B2 * | 12/2005 | Ahonen | ............. | 455/558 |
| 7,171,460 B2 * | 1/2007 | Kalavade et al. | ............. | 709/223 |
| 7,319,757 B2 * | 1/2008 | Kumar | ............. | 380/247 |
| 7,577,431 B2 * | 8/2009 | Jiang | ............. | 455/432.1 |
| 8,160,217 B2 * | 4/2012 | New | ............. | 379/93.12 |
| 8,244,612 B2 * | 8/2012 | Chakiris et al. | ............. | 705/35 |
| 2001/0005678 A1 * | 6/2001 | Lee | ............. | 455/445 |
| 2003/0220994 A1 * | 11/2003 | Zhu | ............. | 709/223 |
| 2004/0023689 A1 * | 2/2004 | Ahonen | ............. | 455/558 |

(Continued)

FOREIGN PATENT DOCUMENTS

| EP | 0778716 A2 | 6/1997 |
|---|---|---|
| EP | 1645931 | 4/2006 |

(Continued)

OTHER PUBLICATIONS

3rd Generation Partnership Project. "3GPP TR 33.812 V0.1.0. 3rd Generation Partnership Project; Technical Specification Group Services and System Aspects; Feasibility Study on Remote Management of USIM Application on M2M Equipment; (Release 8)." Jan. 2008.

(Continued)

*Primary Examiner* — Peter Poltorak
(74) *Attorney, Agent, or Firm* — Coats & Bennett, P.L.L.C.

(57) ABSTRACT

Disclosed are a system and methods for associating a "generic" wireless device, i.e., a device that is not pre-programmed with subscription credentials corresponding to a particular operator, with a Home Operator designated by the device's owner. The disclosed system and methods further facilitate the automatic linking of a newly activated M2M device to an appropriate server for downloading the subscription credentials for the Home Operator. The disclosed system includes a registration server for maintaining electronic registration data for a plurality of wireless devices and for directing newly activated wireless devices to a server for downloading "permanent" subscription credentials, such as a downloadable USIM. The disclosed system further includes a subscription server for updating registration server entries to reflect an association between a first wireless device and its corresponding home network. In some embodiments, the subscription server may be further configured for downloading subscription credentials to subscribing wireless devices.

19 Claims, 6 Drawing Sheets

U.S. PATENT DOCUMENTS

| | | | |
|---|---|---|---|
| 2004/0162998 A1* | 8/2004 | Tuomi et al. | 713/202 |
| 2004/0166898 A1* | 8/2004 | Tajima | 455/560 |
| 2004/0168184 A1* | 8/2004 | Steenkamp et al. | 725/31 |
| 2006/0003778 A1* | 1/2006 | Hogdahl et al. | 455/466 |
| 2006/0116127 A1* | 6/2006 | Wilhoite et al. | 455/442 |
| 2006/0161490 A1* | 7/2006 | Chakiris et al. | 705/35 |
| 2006/0183500 A1* | 8/2006 | Choi | 455/558 |
| 2007/0049269 A1* | 3/2007 | Ophir et al. | 455/432.1 |
| 2007/0153768 A1* | 7/2007 | Jagadesan et al. | 370/352 |
| 2007/0298795 A1* | 12/2007 | Zinn et al. | 455/435.1 |
| 2008/0051062 A1* | 2/2008 | Lee | 455/411 |
| 2008/0070555 A1* | 3/2008 | Sharma | 455/414.1 |
| 2009/0217364 A1* | 8/2009 | Salmela et al. | 726/6 |
| 2010/0217837 A1* | 8/2010 | Ansari et al. | 709/218 |

FOREIGN PATENT DOCUMENTS

| | | |
|---|---|---|
| EP | 1758335 A1 | 2/2007 |
| GB | EP0778716 * | 6/1997 |

OTHER PUBLICATIONS

3rd Generation Partnership Project. "3GPP TR 33.812 V0.2.2. 3rd Generation Partnership Project; Technical Specification Group Services and System Aspects; Feasibility Study on Remote Management of USIM Application on M2M Equipment; (Release 8)." Mar. 2008.

3rd Generation Partnership Project. "3GPP TR 33.812 V0.3.0. 3rd Generation Partnership Project; Technical Specification Group Services and System Aspects; Feasibility Study on Remote Management of USIM Application on M2M Equipment; (Release 8)." May 2008.

3rd Generation Partnership Project. "3GPP TS 43.020 V7.2.0. 3rd Generation Partnership Project; Technical Specification Group Services and System Aspects; Security Related Network Functions (Release 7)." Dec. 2007.

Gehrmann, C. "Method and System for Mobile Device Credentialing." Co-pending U.S. Appl. No. 11/948,352, filed Nov. 30, 2007.

Gehrmann, C. "Secure Soft SIM Credential Transfer." Co-pending U.S. Appl. No. 11/944,818, filed Nov. 26, 2007.

Lehtovirta, V. P. et al. "Methods and Apparatus for Locating a Device Registration Server in a Wireless Network." Co-pending U.S. Appl. No. 12/139,773, filed Jun. 16, 2008.

Salmela, P. M. et al. "Method and Apparatus for Managing Subscription Credentials in a Wireless Communication Device." Co-pending U.S. Appl. No. 12/140,728, filed Jun. 17, 2008.

* cited by examiner

METHODS AND APPARATUS FOR WIRELESS DEVICE REGISTRATION

RELATED APPLICATION

This application claims priority under 35 U.S.C. §119(e) to U.S. provisional application Ser. No. 61/030,695, filed Feb. 22, 2008 and titled "Method for Identifying Device Owner During Home Operator Registration," the entire contents of which are incorporated herein by reference.

TECHNICAL FIELD

The present invention relates generally to wireless communication systems, and in particular relates to methods, apparatus, and systems for processing registration data for wireless devices for use in downloading network subscriber credentials such as a downloadable Universal Subscriber Identity Module (DLUSIM).

BACKGROUND

Machine-to-machine (M2M) communications technologies allow the deployment of wireless devices that do not require human interaction to operate. Wireless M2M devices have been deployed or proposed for a wide range of telemetry and telematics applications. Some of these applications include utility distribution system monitoring, remote vending, security systems, and fleet management.

One of the challenges for wireless M2M deployment is how to allow for efficient "provisioning" of services. In particular, each wireless M2M device must be activated for operation in a particular network. With conventional 3G cellular telephones, provisioning is typically accomplished using a Universal Subscriber Identity Module (USIM), an application installed on a Universal Integrated Circuit Card (UICC) provided by the wireless network operator. The USIM/UICC may be inserted into a cellular handset to tie the handset to a particular subscription, thus allowing the handset user to access subscribed services through his home operator's network and, in many cases, through cooperating partner networks. Although reasonably convenient for individual consumers, this approach to provisioning may be impractical for an M2M application where a single entity may deploy hundreds of wireless devices across a large geographical area. For instance, in some cases a wireless device may be factory installed in a larger piece of equipment (e.g., an automobile), making later insertion of a SIM card impractical or impossible. In other instances, M2M devices may be deployed over a wide geographical area, such that no single wireless operator can provide the needed coverage. In such cases, matching the proper operator-specific USIMs to the correct devices can be problematic. Finally, re-configuring the M2M device, e.g., to transfer the device to a subscription with a different operator, can be expensive, especially when the M2M device is in a remote location.

Because of these challenges, the wireless industry has recently been investigating the possibility of downloadable subscription credentials, e.g., a downloadable USIM (or DLUSIM). In particular, the $3^{rd}$-Generation Partnership Project (3GPP) has been studying the feasibility of using DLUSIM technology for remote management of wireless M2M devices. A 3GPP report entitled "Technical Specification Group Services and System Aspects; Feasibility Study on Remote Management of USIM Application on M2M Equipment; (Release 8), 3GPP TR 33.812, is currently under development.

In one approach under study, preliminary subscription credentials, e.g., a Preliminary International Mobile Subscriber Identity and associated keys, etc., are pre-programmed into each wireless M2M device. These preliminary credentials may be used to gain initial access to an available wireless network for the limited purpose of downloading "permanent" subscription credentials, such as a downloadable USIM. The preliminary credentials are associated with a registration service, which facilitates temporary access to a 3GPP network and connection to a provisioning server associated with a wireless operator offering the desired services.

The general approach is that a wireless M2M device uses the preliminary credentials to perform an initial network attachment procedure to an available network, according to conventional wireless network protocols. The network to which the device connects may be assumed to be a visited network, so that the connection is made according to roaming procedures. Once connected to the network, the M2M device establishes a connection with a provisioning server for downloading a USIM.

Although the above procedure permits an initial connection to a 3GPP network, it does not provide a complete solution for provisioning wireless M2M devices. Thus, a mechanism for linking a deployed wireless M2M device to a subscription for mobile network services from a wireless operator is needed. In particular, mechanisms are needed for registering a newly deployed wireless device with a desired operator (or "Home Operator") and for updating that registration as required.

SUMMARY

The present invention provides a system and methods for associating a "generic" wireless M2M device, i.e., a device that is not pre-programmed with subscription credentials corresponding to a particular operator, with a Home Operator designated by the device's owner. The disclosed system and methods further facilitate the automatic linking of a newly activated M2M device to an appropriate server for downloading the subscription credentials for the Home Operator.

The disclosed system includes a registration server for maintaining electronic registration data for a plurality of wireless devices and for directing newly activated wireless devices to a server for downloading "permanent" subscription credentials, such as a downloadable USIM. The disclosed system further includes a subscription server for updating registration server entries to reflect an association between a subscribing wireless device and its corresponding home network. In some embodiments, the subscription server may be further configured for downloading subscription credentials to subscribing wireless devices.

Accordingly, an exemplary registration server according to some embodiments of the invention comprises a storage unit configured to store a plurality of preliminary device identifiers and corresponding security codes, wherein each preliminary device identifier is associated with a wireless device. The registration server further comprises a network interface, and a processing unit for processing registration update requests. In some embodiments, the processing unit is configured to receive a registration update request via the network interface, the registration update request comprising a first device identifier, a first candidate security code, and home network data for a first wireless device. The processing unit authenticates the registration update request by comparing the first candidate security code to a stored security code corresponding to the first device identifier, and stores the home network data in the storage unit in association with the first device identifier and corresponding security code. In some embodiments, the processing unit is further configured to receive a connection request via the network interface from the first wireless device corresponding to the first device identifier, and to send at least a portion of the home network data to the first wireless device via the network interface. This portion may include a network address for use by the first wireless device in downloading subscription credentials.

An exemplary subscription server according to some embodiments of the invention comprises a network interface and a processing unit configured to receive an electronic subscription request for a first wireless device via the network interface, the subscription request comprising a preliminary device identifier and a corresponding security code for the first wireless device. The subscription server sends a registration update request to a registration server via the network interface, the registration update request comprising the preliminary device identifier, the corresponding security code, and home network data for the first wireless device, wherein the home network data identifies a network address for downloading subscription credentials. In some embodiments, the subscription server is further configured to receive a credential download request from the first wireless device via the network address, wherein the credential download request is addressed to the network address identified by the home network data, and to send subscription credentials to the first wireless device for use in accessing network services.

Corresponding methods for maintaining electronic registration data for wireless devices and for updating the registration data are also disclosed.

DETAILED DESCRIPTION

In the description that follows, various aspects of the present invention are described in relation to network standards promulgated by the $3^{rd}$-Generation Partnership Project (3GPP). Those skilled in the art will appreciate that these techniques may be applied to other wireless systems where subscription credentials may be downloaded to a wireless device. Further, although the discussion below is focused on wireless M2M devices, including devices without human interfaces at all, the techniques disclosed herein are more generally applicable, and may in fact be applied to other wireless terminals, including consumer handsets. Finally, those skilled in the art will appreciate that the term "mobile terminal," as used herein, is intended to include any of a wide variety of end-user devices, including in particular any of those devices referred to as "User Equipment," "UE," or "mobile station" by the various specifications promulgated by the 3rd-Generation Partnership or other standards groups. Indeed, the term "mobile terminal" includes wireless terminals adapted for machine-to-machine (M2M) applications, as well as wireless terminals adapted for fixed wireless communications. Those skilled in the art will thus appreciate that the mobile terminals discussed herein may comprise cellular radiotelephones with voice communications capability, data communications capabilities, or both; personal digital assistant (PDA) devices including wireless communications capability; conventional laptop and/or palmtop computers or other appliances that include a wireless transceiver; and wireless transceiver cards and modules adapted for use in host computing devices, which may or may not be portable. Thus, the following description and accompanying drawings should be viewed as illustrative of the present invention, and not limiting.

Figure 1:
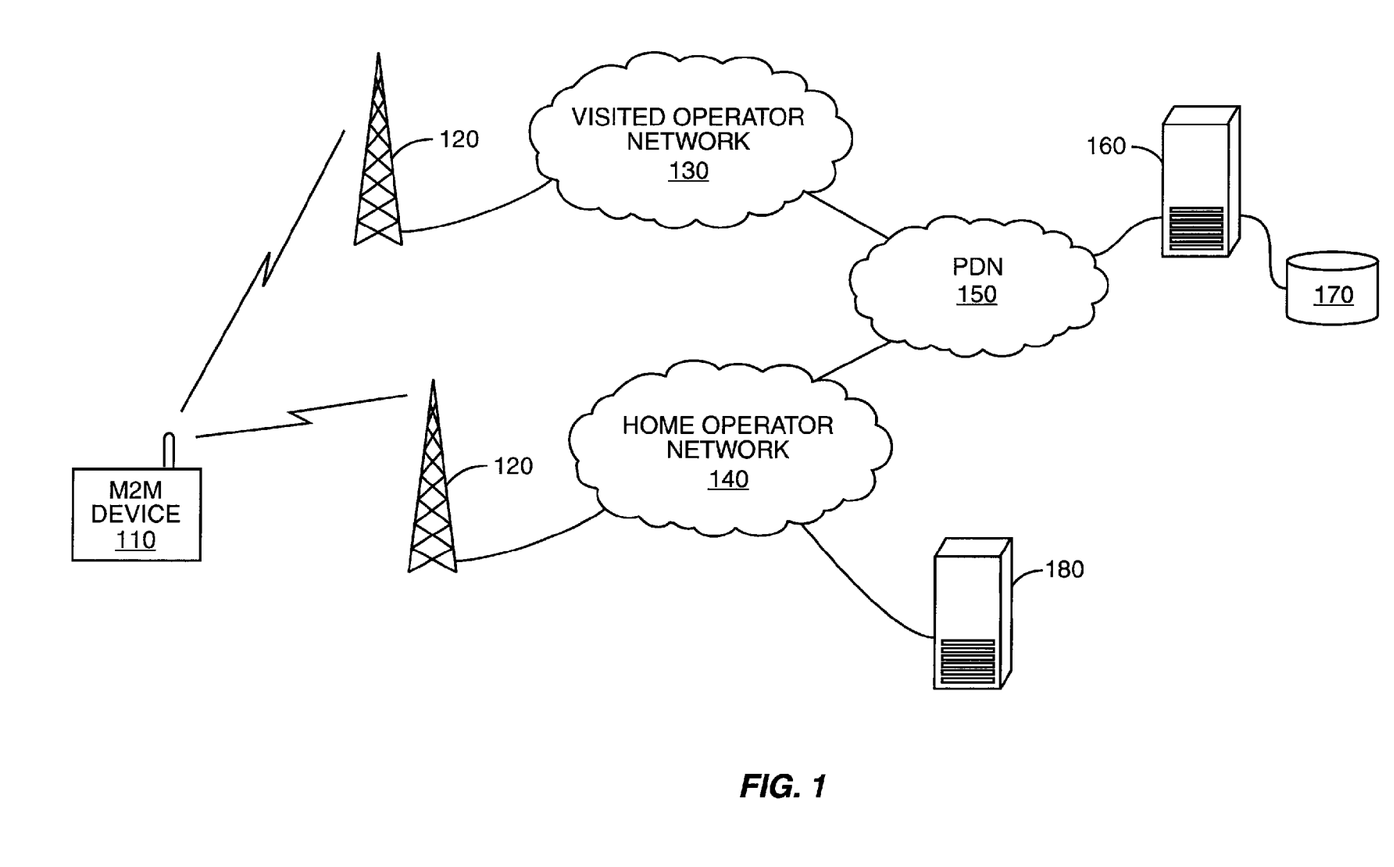
FIG. 1 illustrates a communication network according to one or more embodiments of the invention.

FIG. 1 illustrates a communication network according to one or more embodiments of the invention, and includes a wireless M2M device 110, which is in range of at least two mobile network base stations 120. In the illustrative system of FIG. 1, one base station 120 provides access to a first wireless network, "Visited" Operator network 130, while the other provides access to a second wireless network, "Home" Operator network 140. Those skilled in the art will appreciate that for the purposes of the following discussion the terms "visited" and "home" become significant only after the M2M device 110 is associated with a subscription provided by the operator of Home Operator network (i.e., the "Home Operator"). Indeed, when an M2M device 110 attaches to a network using its preliminary credentials, its "home" operator for the purposes of network attachment is the operator providing the registration service described herein, i.e., the operator that controls the preliminary credentials.

Those skilled in the art will appreciate that M2M device 110 may in some embodiments be a multi-mode and/or multi-band wireless device, such that it supports multiple communications protocols and/or operates at multiple frequency bands. Thus, Visited Operator network 130 and Home Operator network 140 may offer network access through similar or completely different radio access networks.

In any event, each of Visited Operator network 130 and Home Operator network provide wireless data services and access to public data network (PDN) 150, which may be the Internet. Thus, in the pictured system, either wireless network is capable of providing the M2M device 110 access to any publicly accessible resources on the Internet, as well as access to network-specific resources offered by the particular wireless network operator. In the simplified system illustrated in FIG. 1, the M2M device 110 may access a registration server 160, and its associated database 170 via PDN 150 and either the Visited Operator network 130 or the Home Operator network 140. The M2M device 110 may also access subscription server 180 via PDN 150 and one wireless network or the other. Alternatively, in some embodiments, subscription server 180 may be accessed directly via the Home Operator network 140.

As noted above, the techniques disclosed herein are generally applicable to systems utilizing downloadable USIM (DLUSIM) application problem space. Since this is a relatively new problem space, there are no fixed or specified solutions for implementing all functionality that actually enables usage of the downloadable USIM concept. A particular problem that has not been addressed adequately is how to associate a "generic" wireless M2M device, i.e., a device that is not pre-programmed with subscription credentials corresponding to a particular operator, with a Home Operator designated by the device's owner. A closely related problem that is also addressed by the techniques disclosed herein is how to automatically link a newly activated M2M device to an appropriate server for downloading the subscription credentials for the Home Operator. In the disclosure that follows, these processes will be referred to generally as "registration services," or "Home Operator registration."

When a DLUSIM device is created its preliminary International Mobile Subscriber Identity (PIMSI) and other related information is stored at a Registration Service. This Registration Service may be implemented at a registration server, such as the registration server 160 of FIG. 1. When the user of this device eventually decides to activate the device, she will need to subscribe for mobile network usage from a wireless network operator, referred to herein as the Home Operator. However, in order for the Home Operator to know the device's credentials, the user must provide some identifying information to the Home Operator. This is most conveniently done via the Internet. Hence, the inventive techniques disclosed herein provide a mechanism for how the Home Operator and the Registration Service can ensure that a user is registering her own device instead of just typing some random credentials, and that subscription credentials are easily accessible to authorized devices.

In addition to the PIMSI, many of the techniques described herein rely on a security code associated with the PIMSI. This security code, which is sometimes referred to herein as a Preliminary IMSI Identifier (PID), acts as an identification token for the DLUSIM device user. Although the PID does not identify the user per se, it indicates the authority of the user to register the subscribing DLUSIM device with a certain home operator. As will be clear to those skilled in the art, the PID need not be unique for each device, but it should be difficult to guess the PID that is associated with any given PIMSI.

Figure 2:
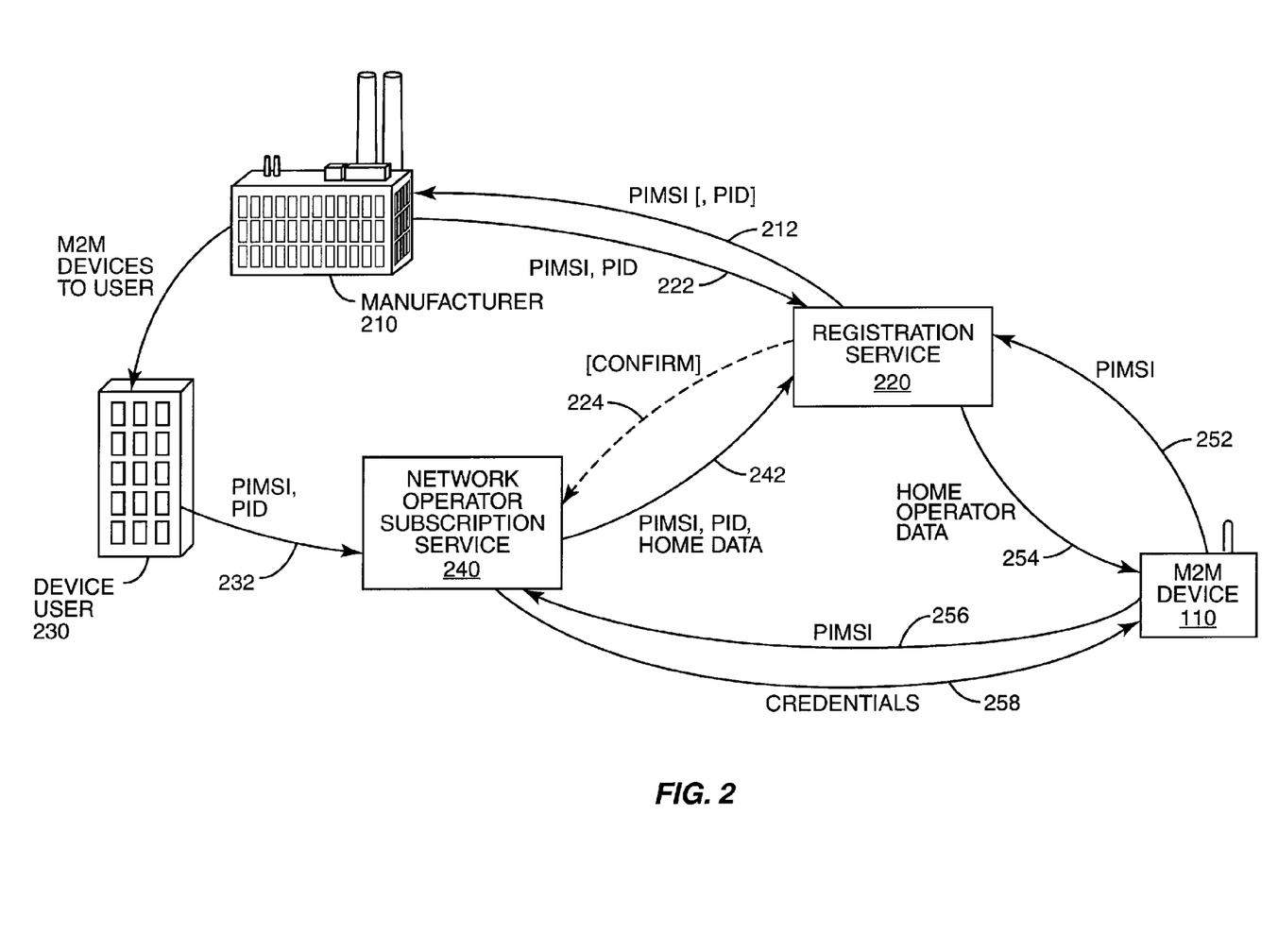
FIG. 2 illustrates the flow of registration information and subscriber credentials according to some embodiments of the invention.

The general solution disclosed herein may be illustrated with the following example, with reference to FIG. 2. A metering device manufacturer orders preliminary credentials for each device from a Registration Service 220. (Note that the nodes pictured in FIG. 2 represent functional entities; these nodes may or may not correspond to discrete physical nodes or geographic locations.) In some embodiments, the Registration Service 220 provides preliminary credentials for each device, accompanied with all relevant information for downloadable USIM usage, including the PIMSI, the associated keys, and the Preliminary IMSI Identifier (PID), as shown at 212. In other cases, the Registration Service 220 provides only the preliminary credentials, and the manufacturer generates corresponding PIDs, returning the PIDs to the Registration Service 220 as shown at 222. In any case, the PID may be a numeric or alphanumeric password or other code. In some cases, the PID is preferably human-readable, although this is not necessarily the case.

In any event, the manufacturer 210 builds the PIMSI credentials inside the device, e.g., in the device's non-volatile memory, and provides the PIMSI/PID pair to the buyer of the device. In some applications the manufacturer 210 may simply print the PIMSI number together with the PID on a label, instruction manual, leaflet, or the like. In bulk applications, manufacturer 210 might instead securely provide an electronic database of PIMSI and corresponding PIDs to a customer.

Upon deploying the device, the device end-user (pictured in FIG. 2 at 230) wishes to create a subscription for the device for wireless network service provided by a particular wireless operator, i.e., the Home Operator. The device user 230 thus accesses a network operator subscription service 240 provided by the service provider of his choice (i.e., the Home Operator or an affiliate); the subscription service 240 may be provided via an Internet website. The device user 230 then simply provides the subscription service 240 with the PIMSI of the subscribing device and the corresponding PID, as shown at 232. (Possession of the PID "proves" that the device user 230 actually has control of the device corresponding to the PIMSI.)

Once this is performed, the Subscription Service 240 contacts the Registration Service 220, and provides the Registration Service 220 with the PIMSI, the corresponding PID, and data identifying the Home Operator network, as shown at 242. The Subscription Service 240 thus informs the Registration Service 220 that the device identified by the PIMSI is now served by the Home Operator. To avoid fraudulent registrations, the Registration Service 220 may authenticate the registration update request from the Subscription Service 240 by comparing the PID supplied with the request to the PID previously stored by the Registration Service 220 in association with the corresponding PIMSI. Unless the PID matches the one stored at the Registration Service 220, the request is denied. If the request is authenticated, however, then the Registration Service 220 stores the Home Operator identifying data in association with the PIMSI for the device. (In some embodiments, the Registration Service 220 may return a confirmation message, as shown at 224.) Thus, the Registration Service 220 maintains a database associating device PIMSIs with wireless operators.

In some implementations, it may be desirable to provide additional security for the PID, to prevent misuse by the Subscription Service operator or by someone gaining unauthorized access to data maintained by the Subscription Service. Accordingly, in some embodiments of the invention, a device owner may contact the Registration Service 220 prior to contacting the Subscription Service 240, to request a one-time security code, which may be viewed as a secondary PID. The owner may be required to authenticate himself, using the device PIMSI and PID, before receiving the one-time security code. When subsequently contacting the Subscription Service 240, the owner then supplies the one-time security code to the Subscription Service 240, rather than the more permanent PID. The Subscription Service 240 subsequently supplies the one-time security code to the Registration Service 220 for use in authenticating the registration update request. The Registration Service 220 may then mark the one-time security code as invalid, so that it may not be used again.

For further security, the issued one-time security codes may have a lifetime limitation "built in". In one approach, the one-time security code might be generated based on a date code or time code, e.g., by hashing the PIMSI, PID, and current date. When authenticating a registration update request from the Subscription Service 240, the Registration Service 220 may then repeat the same calculation—if the date does not match, then the results of the calculation will differ and the request rejected.

In any event, once the Registration Service 220 is notified about the (new) home operator of the device, the device may use its preliminary credentials to connect to the network and, via the Registration Service, find out how to find its home network and download a proper USIM. As noted above, the preliminary credentials identified by the PIMSI allow the M2M device temporary access to the network. In some embodiments, the PIMSI is indistinguishable from a conventional IMSI. Thus, unless the network to which the device first attaches happens to be the operator providing the registration service (and thus the operator controlling the preliminary credentials), the network is likely to treat the device as it would any other roaming device, and to contact the registration operator for authentication of the device using normal roaming protocols. So, although recognition of the PIMSI as such by the visited network is possible, it is not required; access to network services may be temporarily provided to the device using conventional telecommunications protocols. Further, those skilled in the art will appreciate that the registration operator may limit the services made available to the device until an actual USIM is downloaded. In particular, the M2M device may be limited to data connections to the Registration Service 220 and the Subscription Service 240 (or other provisioning server). Thus, upon activation, the M2M device 110 attaches to an available network using its preliminary credentials, and then establishes a data connection to the Registration Service 220. Upon providing its PIMSI to the Registration Service 220, as shown at 252, the Registration Service 220 provides the M2M device 110 with data directing the M2M device 110 to a provisioning server for the Home Operator, as shown at 254. Of course, the Registration Service 220 may require additional authentication procedures before providing the Home Operator address data; these procedures are not illustrated in FIG. 2. In any event, the home operator data may comprise an address to the provisioning server (e.g., an IP address, or URL), or may be a parameter that is used by the M2M device 110 to retrieve an address from a look-up table, or to form an address.

In some cases, the provisioning server may be part of the Home Operator Subscription Service 240. In this case, as is pictured in FIG. 2, the M2M device 110 connects to the Subscription Service 240, and provides its PIMSI, as shown at 256. In return, the Subscription Service 240 provides the downloadable subscription credentials, e.g. a downloadable USIM. Again, the Subscription Service 240 will likely require additional authentication procedures before providing the downloadable credentials; a wide range of applicable authentication procedures are well known to those skilled in the art.

Figure 3:
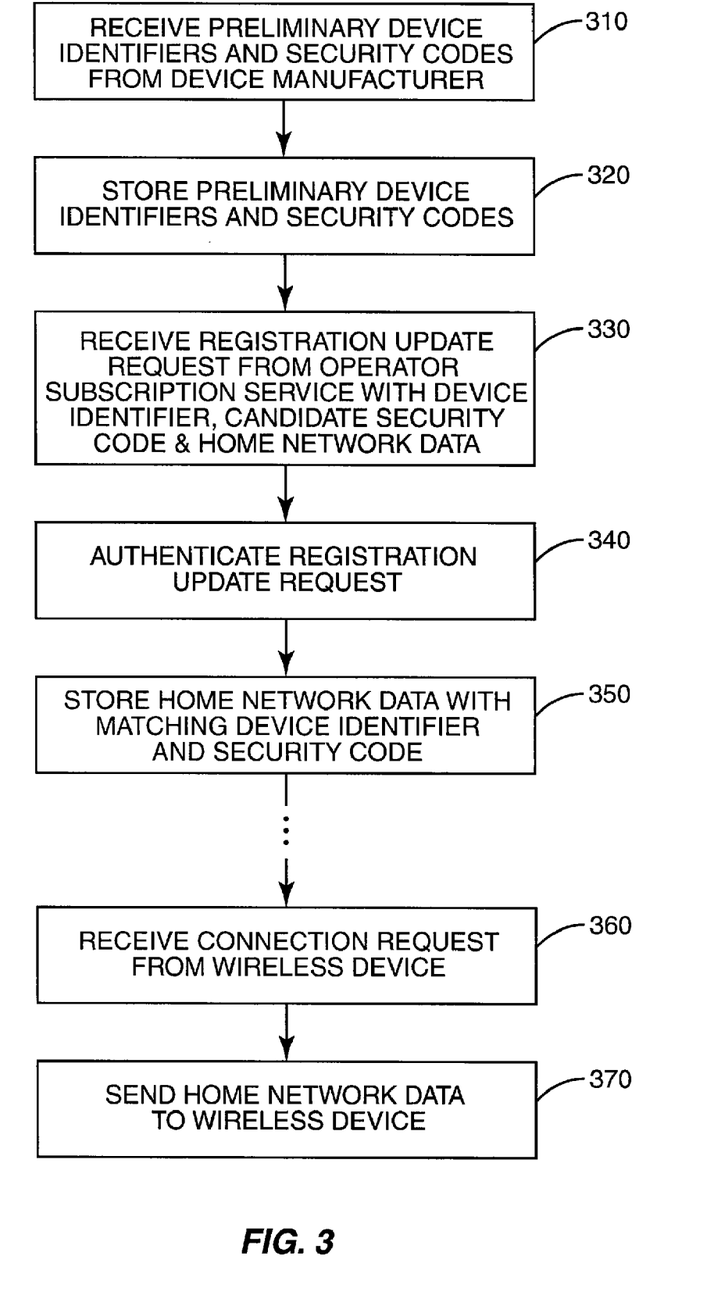
FIG. 3 is a logic flow diagram illustrating an exemplary method for maintaining electronic registration data for a plurality of wireless devices.

With the exemplary communication network of FIG. 1 and the exemplary message flow of FIG. 2 in mind, FIG. 3 illustrates a general method for maintaining electronic registration data for a plurality of wireless devices. In some embodiments, the method of FIG. 3, or a variant thereof, may be implemented at a registration server, such as the registration server 160 pictured in FIG. 1, providing services such as those described in connection with Registration 220 in FIG. 2.

The method of FIG. 3 begins with the reception of a plurality of preliminary device identifiers and security codes from a device manufacturer, as shown at block 310. In the pictured method, then, the preliminary device identifiers (which may be PIMSIs) and the corresponding security codes (PIDs) are supplied to a registration service by a manufacturer. In other embodiments, the preliminary device identifiers and security codes may be supplied by one or more wireless network operators; one of these wireless network operators may also operate the registration service. In still other embodiments, the operator of the registration service may provide a manufacturer with preliminary device identifiers, and the manufacturer may supply corresponding security codes.

In any event, the preliminary device identifiers and security codes are stored, as shown at block 320. The preliminary device identifiers and security codes are generally stored in a database, which may be physically co-located with the registration server, such as in the external storage device 170 pictured in FIG. 1, or remotely located and accessible via a private or public data network.

At block 330, the registration service receives a registration update request from an operator subscription service. The registration update request comprises a device identifier, a candidate security code, and data identifying the Home Operator network. For example, a registration update request may look like "Register PIMSI: 224387123456789 to 'Home Operator', PID: 746726". In effect, the registration update request is an instruction to link the device identifier to the Home Operator network data. Although described here as a registration "update" request, such a request may establish such a link for the first time. Thus, a single-format command may be used to establish new registrations or to update previously established registrations. In other embodiments, a separate command or procedure may be used to update previously established registrations.

In any case, the candidate security code is used to authenticate the request, as shown at block 340, thus establishing that the requester (e.g., the operator subscription service) is authorized to update the registration information. Accordingly, the supplied device identifier is used to retrieve stored information associated with the matching device identifier in memory, and the candidate security code is compared to the security code already stored in association with the supplied device identifier. If it matches, the registration update request is authorized, and the home operator data is stored, as shown at block 350, along with the matching device identifier and security code.

At some later time, the registration service may be accessed by the wireless device corresponding to the preliminary device identifier processed at blocks 320-350. Thus, as shown at block 360, a connection request is received from the wireless device. This connection request may take a variety of forms, but will generally comprise at least one message that includes the PIMSI identifying the device. Authentication procedures may also be employed, to ensure that the connection request actually originates from the wireless device identified by the PIMSI. For example, Public Key Infrastructure (PKI) technology may be used to validate a message signed by the wireless device using a secret key or a certificate stored in the device.

Upon receipt of the connection request (and upon successful completion of any authentication procedures), home network data is sent to the wireless device, as shown at block 370. As noted above, this home network data may in some cases comprise a network address, such as an Internet Protocol (IP) address, or a Uniform Resource Locator (URL), for use by the wireless device in accessing and downloading subscription credentials. In other cases, the home network data may include a pointer to such a network address. For instance, the home network data may include a parameter used by the wireless device to index a stored look-up table containing several network addresses. Alternatively, the home network data may include a parameter that may be used to calculate or form a complete network address. For example, the home network data may include an alphanumeric code that may be combined with a stored template to form an operator-specific URL.

The method of FIG. 3 generally depicts a procedure for initial registration and activation of a wireless device. The steps illustrated in blocks 310 and 320 may thus occur even before the device is sold. In such a case, the Registration Service entry for a given preliminary device identifier may indicate that there is no Home Operator defined for the device in question. After block 350, the entry includes a field indicating the Home Operator. Of course, those skilled in the art will appreciate that the method illustrated in FIG. 3 is but one exemplary approach to providing an activation procedure.

In the event that a device is resold or re-deployed, the subscription associated with a wireless device may be changed. In some cases, of course, the owner of a device may simply change operators. In any event, the home network data associated with a preliminary device identifier may need to be updated. Furthermore, the user may request a change to the security code associated with a device; a security code change request may be separate from or in conjunction with a change to subscription data. Thus, in some embodiments, a registration service, such as a registration service implemented at the registration server 160 of FIG. 1, may update one or more parameters associated with a device registration according to the method of FIG. 4.

Figure 4:
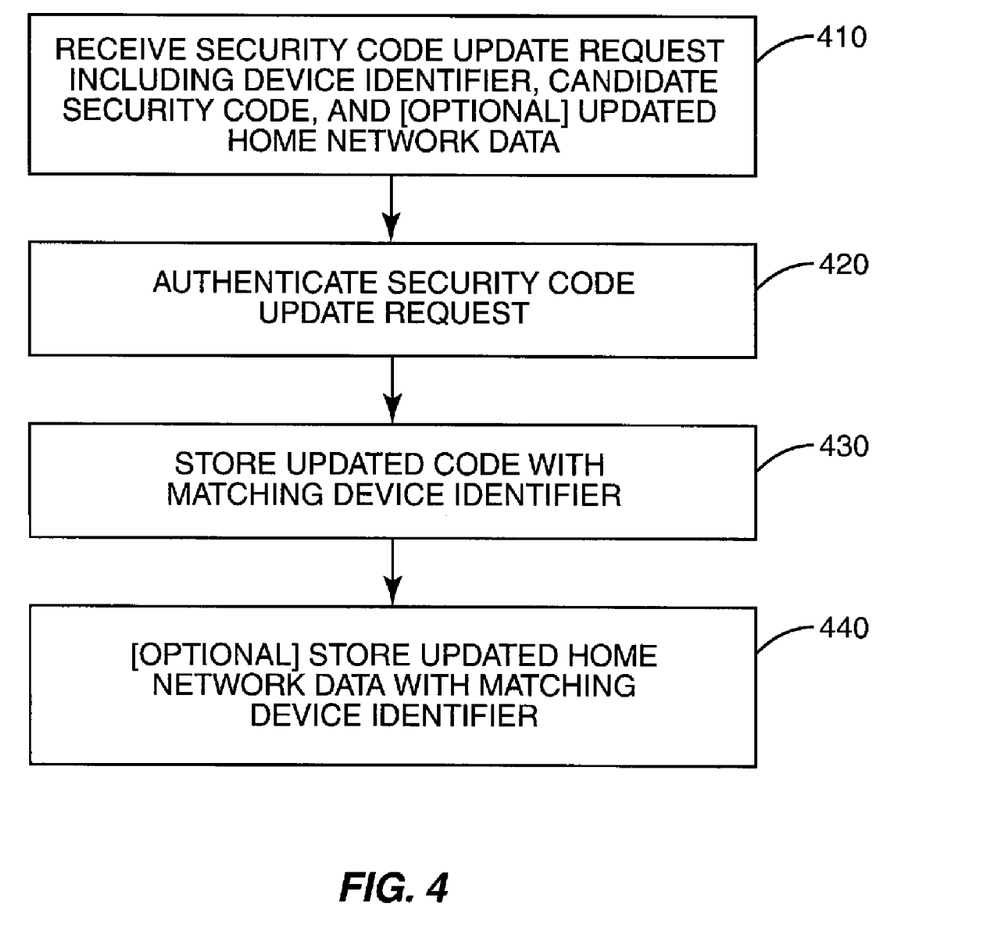
FIG. 4 is a logic flow diagram illustrating an exemplary method for updating security code information for a wireless device in a registration system.

The method of FIG. 4 begins at block 410, with the receipt of a security code update request. The security code update request includes the device identifier and the new security code, and should generally also include a candidate security code corresponding to the security code already stored by the registration service. Optionally, the security code update request may also include updated home network data. For example, a security code update request may look like: "Register PIMSI: 224387123456789 to 'New Home Operator', PID: 746726, NEWPID: hxus82H". (Although termed a "security code update request" for the purposes of this discussion, one or more embodiments of the invention may employ a single update request format that allows updates to one or both of the security code or home network. As noted above, this same request format may also support initial registration of home network data. Other embodiments may require separate commands for the updating of the security code and the home network data. Thus, for the purposes of this disclosure, the term "request" may include one or several messages or commands.)

At block 420, the candidate security code supplied in the update request is used to authenticate the request. Thus, in some embodiments, the supplied device identifier is matched to a stored preliminary device identifier, and the candidate security code is compared to the security code stored in association with the matching preliminary device identifier. If the security codes match, the request is authorized, and the updated security code is stored in association with the stored preliminary device identifier, as shown at block 430. In some embodiments, the original security code is updated, or overwritten, by the new security code; in other embodiments the original security code may be retained along with the new security code.

Similarly, at block 440, updated home network data, if supplied with the update request, is stored in association with the matching preliminary device identifier. The updated home network data is used in the event that the corresponding device subsequently requests a connection to its home operator's provisioning server.

Figure 5:
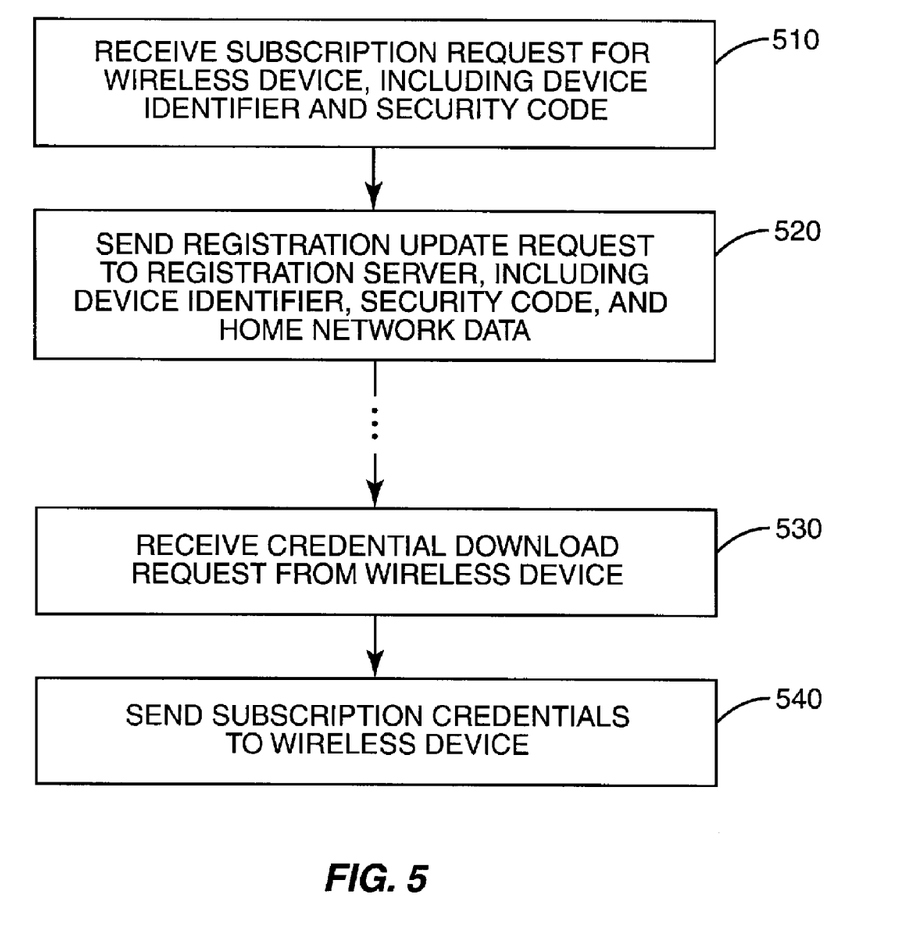
FIG. 5 is a logic flow diagram illustrating an exemplary method for updating electronic registration data for a wireless device and distributing subscription credentials to the wireless device.

FIG. 5 illustrates an exemplary method for updating electronic registration data for a wireless device. All or part of the method of FIG. 5, may be implemented, for instance, at a subscription server, such as the subscription server 180 of FIG. 1, operated by a wireless network operator. Thus FIG. 5 illustrates an exemplary procedure that might be followed when a device owner seeks to link a wireless device to a new or existing subscription with the wireless network operator.

The method of FIG. 5 begins, as shown at block 510, with the receipt of a subscription request for a wireless device. This subscription request may be received from the device owner, in some cases via an Internet website interface. In some instances, the subscription request may be for only a single device. In others, a device owner may provide a bulk subscription request identifying several wireless devices. In any event, the subscription request includes at least one preliminary device identifier and a corresponding security code, and may include further information, such as identifying information for the device owner, account number information, payment information, or the like. (As noted above, "request" in this context may refer to a single message, or to a series of messages and commands.)

As was described above, the device owner may have been provided with the preliminary device identifier and the security code at the time of purchase. By submitting these parameters to the subscription service, the device owner seeks to link the corresponding wireless device to an active subscription with the wireless network operator providing the subscription service.

At block 520, a registration update request is sent to a registration server. The registration update request includes at least the device identifier and the security code provided by the device owner. The registration update request may further include data identifying the home network for the wireless device. This update request may be processed by the registration server according to the methods described above in reference to FIGS. 3 and 4.

In some embodiments, the subscription service may select an appropriate registration service from several available services. For instance, there may be several registration services in different geographic regions. In such a scenario, M2M devices destined for a particular region may be manufactured with preliminary credentials associated with the closest regional registration service. Identification of the appropriate registration service by the subscription service may be based on the preliminary device identifier or other device-related information. For instance, different blocks of PIMSIs may correspond to different registration services, in which case the appropriate registration service may be identified by simply examining the preliminary device identifier. In other cases, the proper registration service may correspond to the manufacturer of the device, or to the type of device.

The home network data provided to the registration service is used by the registration service to link the wireless device to the home operator. The registration service uses this information later to direct the wireless device to an appropriate network address for downloading subscription credentials, such as a downloadable USIM. The credentials downloading service is a part of the wireless operator's subscription services; in some cases this downloading service may be performed using the same server used to provide the subscription request management discussed above, while in others it may be provided by a separate provisioning server. This downloading service is thus illustrated in FIG. 5 at blocks 530 and 540. At block 530, a credential download request is received from a wireless device via the wireless network. This request may take any of a number of forms, as discussed above, and may include authentication procedures to ensure that the request originated from an authorized device. As noted above, such authentication procedures may include, for example, the use of PKI certificates to authenticate a digitally signed message from the wireless device. In any event, upon successful authentication, if any, the subscription credentials are sent to the wireless device, as pictured at block 540. These subscription credentials may be used by the wireless device for subsequent access to its home network, and for access to the services to which the device owner has subscribed.

Figure 6:
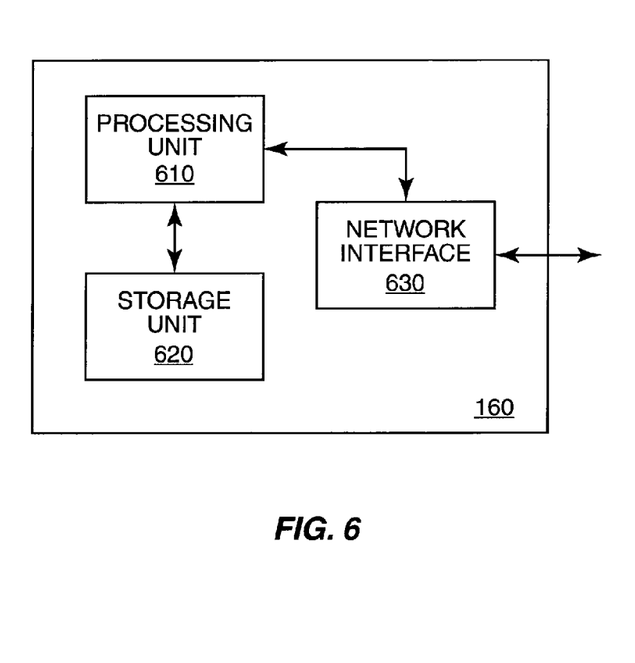
FIG. 6 is a block diagram of a registration server according to some embodiments of the invention.
Figure 7:
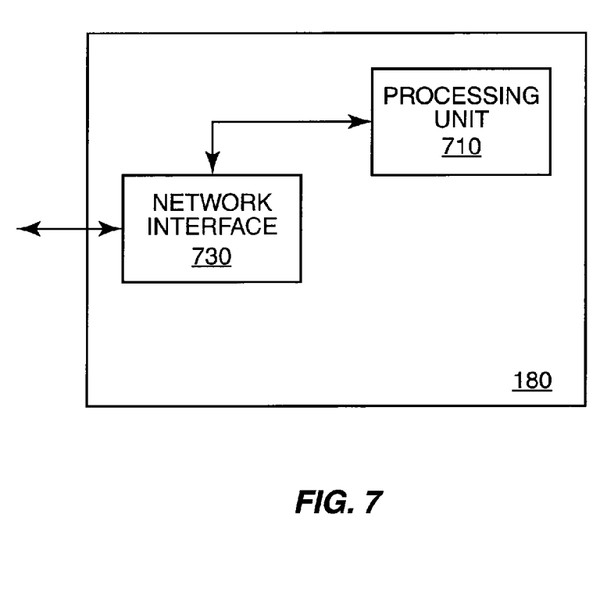
FIG. 7 is a block diagram of a subscription server according to some embodiments of the invention.

As noted above, the registration services and subscription services described herein may be provided over a public data network, a private data network, or both. In some instances, either or both services may be provided using websites accessible via the Internet. FIGS. 6 and 7 thus provide simplified block diagrams of an exemplary registration server 160 and subscription server 180, respectively. Servers 160 and 180 may comprise conventional network data server equipment configured to carry out one or more of the methods described above.

In particular, registration server 160 comprises a processing unit 610, which may include one or more general-purpose microprocessors configured with appropriate software to carry out one or more of the methods described above in conjunction with FIGS. 3 and 4. Registration server 160 further comprises a network interface 630, which provides access to a private or public data network, such as the Internet, and a storage unit 620. Storage unit 620 may comprise one or more memory devices co-located with the other components of registration server 160. Storage unit 620 may also, or instead, comprise one or more memory devices located remotely from the other components of registration server 160.

Thus, in some embodiments, the storage unit 620 is configured to store a plurality of preliminary device identifiers and corresponding security codes, wherein each preliminary device identifier is associated with a wireless device. In some embodiments, the preliminary device identifiers may comprise PIMSIs. In some embodiments, the security codes may comprise human-readable codes. In some embodiments, the processing unit 610 of registration server 160 is configured to receive a registration update request via the network interface 630, the registration update request comprising a first device identifier, a first candidate security code, and home network data corresponding to an operator network. The processing unit 610 is further configured to authenticate the registration update request by comparing the first device identifier and the first candidate security code to the stored preliminary device identifiers and security codes to identify a matching device identifier and matching security code. If the candidate security code matches the stored security code, then the home network data is stored in storage unit 620 in association with the matching device identifier and matching security code.

In some embodiments, the processing unit 610 is further configured to receive a security code update request via the network interface 630, the security code update request comprising a second device identifier, a second candidate security code, and an updated security code. In such embodiments, the processing unit 610 may be further configured to authenticate the security code update request by comparing the second candidate security code with the security code stored in storage unit 620 in association with the device identifier. If the request is successfully authenticated, then the updated security code is stored in storage unit 620 in association with the device identifier.

In some embodiments, the processing unit 610 is still further configured to receive a connection request, via the network interface 630, from a wireless device corresponding to a stored preliminary device identifier and to send at least a portion of the corresponding home network data to the wireless device. The home network data sent to the wireless device may include a network address for use by the wireless device in downloading subscription credentials, or a pointer to such a network address.

Subscription server 180 also comprises a network interface 720, providing access to a private or public data network, and a subscription processing unit 710, which may include one or more general-purpose microprocessors configured with appropriate software to carry out one or more of the methods described above in conjunction with FIG. 5. Thus, in some embodiments the subscription processing unit 710 is configured to receive a subscription request for a subscribing wireless device via the network interface 720, the subscription request including a preliminary device identifier and a corresponding security code for the subscribing wireless device. The subscription processing unit 710 is further configured to send an electronic registration update request to a registration server, via the network interface 720, the registration update request including the preliminary device identifier, the security code, and home network data for the subscribing wireless device. The home network data identifies (directly or indirectly) a network address for downloading subscription credentials.

In some embodiments, the subscription server 180 is further configured to later receive a credential download request from the subscribing wireless device, via the network interface 720, addressed to the network address identified by the home network data. The subscription server 180 then downloads subscription credentials, such as a downloadable USIM, to the subscribing wireless device for subsequent use in accessing network services. In some embodiments, authentication procedures may be invoked prior to downloading the subscription credentials, to ensure that the credential download request originates from an authorized device.

Those skilled in the art will appreciate that a wireless operator may provide registration services, as generally described herein, as well as the subscription services described above. In such a case, the registration services and subscription services may be provided using separate servers, or using one or more of the same servers. Furthermore, those skilled in the art will appreciate that the various processing units described above may each comprise a single microprocessor and associated software, or may comprise two or more microprocessors configured to jointly carry out the various functions described above. The present invention may, of course, be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method for maintaining electronic registration data for a plurality of wireless devices, the method performed by a registration server in a communications network, the method comprising:
   storing a plurality of preliminary device identifiers and corresponding security codes, wherein each preliminary device identifier is associated with a wireless device;
   receiving a registration update request for a first wireless device, the registration update request comprising a first device identifier, home network data for the first wireless device, and a first candidate security code;
   authenticating the registration update request by comparing the first candidate security code to a stored security code corresponding to the first device identifier; and
   storing the home network data for the first wireless device in association with the first device identifier and corresponding security code.

2. The method of claim 1, wherein storing the home network data comprises updating prior home network data associated with the first device identifier and corresponding security code.

3. The method of claim 1, wherein the home network data for the first wireless device comprises a network address for use by the first wireless device in downloading subscription credentials.

4. The method of claim 1, further comprising:
   receiving a security code update request, the security code update request comprising a second device identifier, a second candidate security code, and an updated security code;

authenticating the security code update request by comparing the second candidate security code to a second stored security code corresponding to the second device identifier; and storing the updated security code in association with the second device identifier.

5. The method of claim 4, wherein storing the updated security code in association with the second device identifier comprises replacing the second stored security code with the updated security code.

6. The method of claim 1, further comprising:
receiving a connection request from the first wireless device corresponding to the first device identifier; and
sending at least a portion of the home network data to the first wireless device.

7. The method of claim 6, wherein said portion of the home network data comprises one of a network address and a pointer to a network address, for use by the first wireless device in downloading subscription credentials.

8. The method of claim 1, wherein the stored security code corresponding to the first device identifier comprises a one-time security code, and wherein the method further comprises rejecting a second registration update request comprising the first device identifier and the one-time security code.

9. A method for updating registration data for wireless devices, the method comprising:
receiving a subscription request for a first wireless device, the subscription request comprising a preliminary device identifier and a corresponding security code;
sending a registration update request to a registration server, the registration update request comprising the preliminary device identifier, the corresponding security code, and home network data for the first wireless device, wherein the home network data identifies a network address for downloading subscription credentials;
receiving a credential download request from the first wireless device via the network address identified by the home network data; and
sending subscription credentials to the first wireless device for use in accessing network services.

10. The method of claim 9, further comprising selecting the registration server from a plurality of available registration servers based on the preliminary device identifier.

11. A registration server for maintaining electronic registration data for a plurality of wireless devices, the registration server comprising:
a storage unit configured to store a plurality of preliminary device identifiers and corresponding security codes, wherein each preliminary device identifier is associated with a wireless device;
a network interface; and
a processing unit configured to
receive a registration update request via the network interface, the registration update request comprising a first device identifier, a first candidate security code, and home network data for a first wireless device;
authenticate the registration update request by comparing the first candidate security code to a stored security code corresponding to the first device identifier; and
store the home network data in the storage unit in association with the first device identifier and corresponding security code.

12. The registration server of claim 11, wherein the processing unit is configured to store the home network data by updating prior home network data associated with the first device identifier and storing the updated home network data in the storage unit in association with the first device identifier.

13. The registration server of claim 11, wherein the processing unit is further configured to:
receive a security code update request via the network interface, the security code update request comprising a second device identifier, a second candidate security code, and an updated security code;
authenticate the security code update request by comparing the second candidate security code to a second stored security code corresponding to the second device identifier; and
store the updated security code in the storage unit in association with the second device identifier.

14. The registration server of claim 13, wherein the processing unit is configured to store the updated security code in association with the second device identifier by replacing the second stored security code with the updated security code.

15. The registration server of claim 11, wherein the processing unit is further configured to:
receive a connection request via the network interface from the first wireless device corresponding to the first device identifier; and
send at least a portion of the home network data to the first wireless device via the network interface.

16. The registration server of claim 15, wherein said portion of the home network data comprises one of a network address and a pointer to a network address, for use by the first wireless device in downloading subscription credentials.

17. The registration server of claim 11, wherein the stored security code corresponding to the first device identifier comprises a one-time security code, and wherein the processing logic is further configured to reject a second registration update request comprising the first device identifier and the one-time security code.

18. A subscription server for updating registration data for wireless devices, the subscription server comprising a network interface and a processing unit configured to:
receive a subscription request for a first wireless device via the network interface, the subscription request comprising a preliminary device identifier and a corresponding security code for the first wireless device;
send a registration update request to a registration server via the network interface, the registration update request comprising the preliminary device identifier, the corresponding security code, and home network data for the first wireless device, wherein the home network data identifies a network address for downloading subscription credentials;
receive a credential download request from the first wireless device via the network interface, wherein the credential download request is addressed to the network address identified by the home network data; and
send subscription credentials to the first wireless device for use in accessing network services.

19. The subscription server of claim 18, wherein the processing unit is further configured to select the registration server from a plurality of available registration servers based on the preliminary device identifier.

* * * * *